United States Patent
Such et al.

(10) Patent No.: US 11,907,675 B2
(45) Date of Patent: Feb. 20, 2024

(54) GENERATING TRAINING DATASETS FOR TRAINING NEURAL NETWORKS

(71) Applicant: Uber Technologies, Inc., San Francisco, CA (US)

(72) Inventors: Felipe Petroski Such, San Francisco, CA (US); Aditya Rawal, Sunnyvale, CA (US); Joel Anthony Lehman, San Francisco, CA (US); Kenneth Owen Stanley, San Francisco, CA (US); Jeffrey Michael Clune, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 799 days.

(21) Appl. No.: 16/746,674

(22) Filed: Jan. 17, 2020

(65) Prior Publication Data

US 2020/0234144 A1 Jul. 23, 2020

Related U.S. Application Data

(60) Provisional application No. 62/794,477, filed on Jan. 18, 2019.

(51) Int. Cl.
| | |
|---|---|
| *G06F 40/42* | (2020.01) |
| *G06F 18/214* | (2023.01) |
| *G06F 18/21* | (2023.01) |
| *G06F 40/58* | (2020.01) |
| *G06N 3/088* | (2023.01) |
| *G06V 10/774* | (2022.01) |
| *G06V 10/776* | (2022.01) |
| *G06V 20/10* | (2022.01) |
| *G06V 20/58* | (2022.01) |
| *G06N 3/045* | (2023.01) |
| *G06N 3/047* | (2023.01) |
| *G06N 3/084* | (2023.01) |

(52) U.S. Cl.
CPC ............ *G06F 40/42* (2020.01); *G06F 18/214* (2023.01); *G06F 18/217* (2023.01); *G06F 40/58* (2020.01); *G06N 3/088* (2013.01); *G06V 10/774* (2022.01); *G06V 10/776* (2022.01); *G06V 20/10* (2022.01); *G06V 20/58* (2022.01)

(58) Field of Classification Search
CPC .... G06N 3/088; G06N 3/0454; G06N 3/0472; G06N 3/084; G06F 40/58; G06F 40/42; G06K 9/6256; G06K 9/6262; G06V 20/10; G06V 20/58; G06V 10/774; G06V 10/776

See application file for complete search history.

(56) References Cited

U.S. PATENT DOCUMENTS

| | | | |
|---|---|---|---|
| 2018/0240257 A1* | 8/2018 | Li | G06V 10/774 |
| 2019/0102693 A1* | 4/2019 | Yates | G06N 20/00 |

(Continued)

*Primary Examiner* — John W Lee
(74) *Attorney, Agent, or Firm* — Fenwick & West LLP

(57) ABSTRACT

A generative cooperative network (GCN) comprises a dataset generator model and a learner model. The dataset generator model generates training datasets used to train the learner model. The trained learner model is evaluated according to a reference training dataset. The dataset generator model is modified according to the evaluation. The training datasets, the dataset generator model, and the leaner model are stored by the GCN. The trained learner model is configured to receive input and to generate output based on the input.

17 Claims, 7 Drawing Sheets

(56) References Cited

U.S. PATENT DOCUMENTS

| | | | |
|---|---|---|---|
| 2019/0114540 A1* | 4/2019 | Lee | G06F 40/51 |
| 2019/0122120 A1* | 4/2019 | Wu | G06N 3/084 |
| 2020/0134446 A1* | 4/2020 | Soni | G06N 3/08 |
| 2020/0134461 A1* | 4/2020 | Chai | G06N 3/084 |
| 2020/0202733 A1* | 6/2020 | Staudinger | G06N 3/08 |

* cited by examiner

GENERATING TRAINING DATASETS FOR TRAINING NEURAL NETWORKS

CROSS REFERENCE TO RELATED APPLICATIONS

This application claims the benefit of and priority to U.S. Provisional Application No. 62/794,477, filed on Jan. 18, 2019, which is incorporated by reference in its entirety.

BACKGROUND

1. Technical Field

The subject matter described generally relates to neural networks, and in particular to generating training dataset for training neural networks.

2. Background Information

Artificial intelligence is used for performing complex tasks, for example, natural language processing, computer vision, speech recognition, bioinformatics, recognizing patterns in images, and so on. Artificial intelligence techniques used for these tasks include machine learning based models, for example, neural networks. Machine learning based models are trained using training datasets before the model is deployed. The quality of a neural network depends on the quality and size of training datasets used for training the neural network. For example, neural networks for recognizing objects in images have been trained using an ImageNet database storing 14 million images that were manually labelled with information describing objects displayed each image. This image database was built via crowdsourcing with contributions from several users over several years. Such large amount of training data requires significant amount of computing resources, storage resources, as well as manual effort. For several applications, such large amount of training dataset is difficult to provide if not possible. As a result, conventional techniques either require huge amount of resources and effort to build the training datasets or are unable to train the neural networks effectively.

The Figures (FIGS.) and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures. It is noted that wherever practicable similar or like reference numbers are used in the figures to indicate similar or like functionality.

DETAILED DESCRIPTION

Embodiments of the invention use a training dataset generator model for generating training datasets for training machine learning based models, for example, neural networks. The system receives a reference training data set that may be built manually. The system generates training datasets using the training dataset generator model and trains a machine learning based model using the generated training datasets. The system evaluates the trained model using the reference training dataset. The system adjusts the parameters of the training dataset generator model based on the result of evaluation of the trained model using the reference training dataset.

Example Systems

Figure 1:
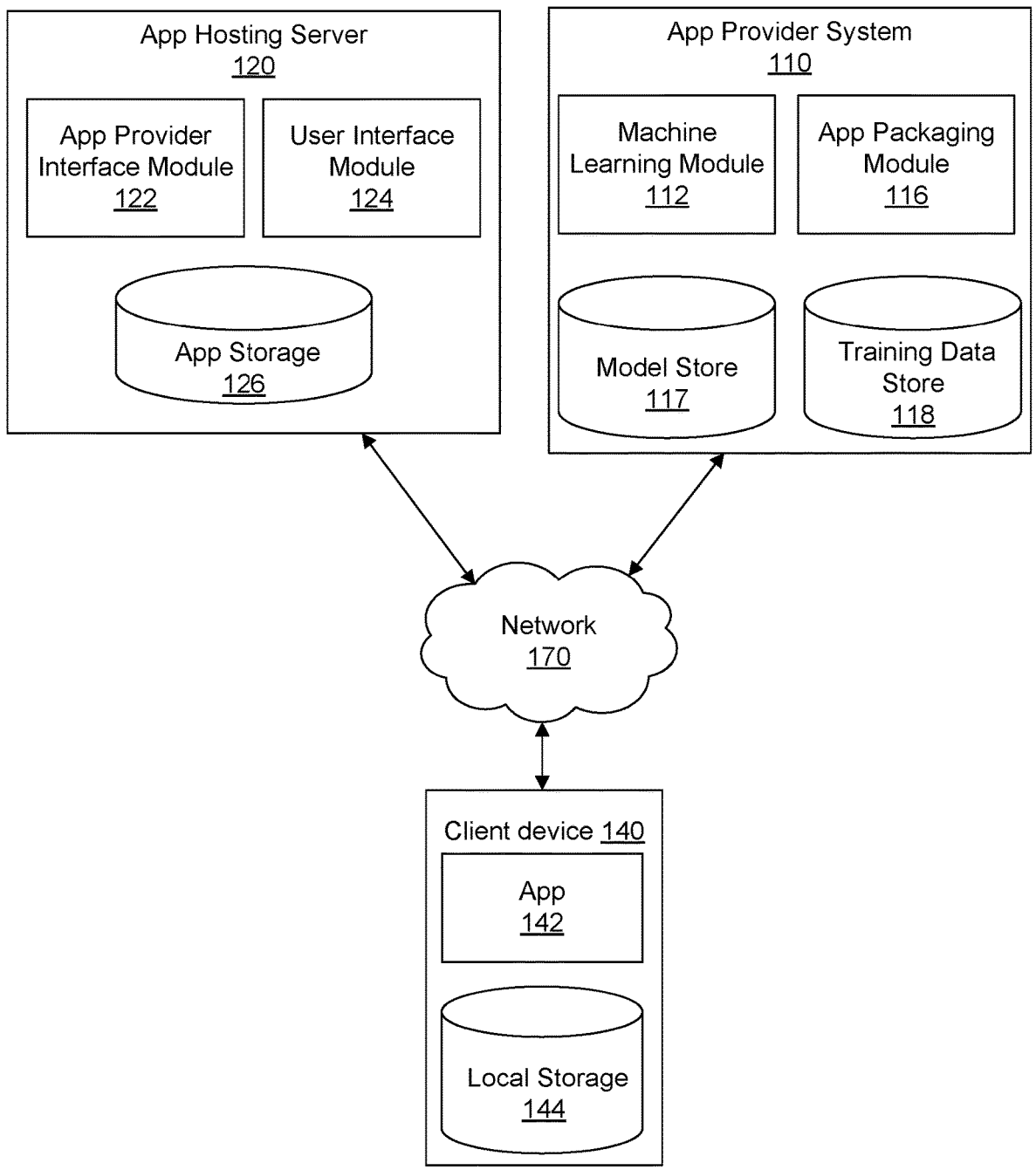
FIG. 1 is a high-level block diagram illustrating a networked computing environment in which machine learning based models may be used, according to one embodiment.

FIG. 1 is a high-level block diagram illustrating a networked computing environment in which machine learning based models may be used, according to one embodiment. In the embodiment shown in FIG. 1, the networked computing environment 100 includes an application provider system 110, an application provider server 120, and a client device 140, all connected via a network 170. An application is also referred to herein as an app. Although only one client device 140 is shown, in practice many (e.g., thousands or even millions of) client devices may be connected to the network 170 at any given time. In other embodiments, the networked computing environment 100 contains different and/or additional elements. In addition, the functions may be distributed among the elements in a different manner than described. For example, the client device 140 may obtain the application 142 directly from the application provider system 110, rather than from the application hosting server 120.

The application provider system 110 is one or more computer systems with which the provider of software (e.g., an application designed to run on a cell phone or tablet) develops that software. Although the application provider system 110 is shown as a single entity, connected to the network 170, for convenience, in many cases it will be made up from several software developer's systems (e.g., terminals) which may or may not all be network-connected.

In the embodiment shown in FIG. 1, the application provider system 110 includes a machine learning module 112, an application packaging module 116, a model store 117, and a training data store 118. In other embodiments, the application provider system 110 contains different and/or additional elements. In addition, the functions may be distributed among the elements in a different manner than described.

The machine learning module 112 is used to train machine learning based models, for example, neural networks. In one embodiment, the machine learning module 112 takes a set of training samples that have known labels and divides it into a training set and a validation set. The machine learning based model is then trained using the training set (e.g., by inputting the training sample, using a backpropagation algorithm to adjust weights to achieve the known label as an output) and then tested against the validation set to determine its accuracy after training. This process can be repeated using variations in the structure of the machine learning based models. Among the variations, results of validation may be compared to identify an optimal machine learning based model (e.g., highest accuracy) capable of reliably determining a correct output for a validation input.

For example, a neural network might be intended to identify faces in photographs. The training and validation sets would contain a variety of faces and instances of images including no face at all. The network is trained by adjusting parameters (e.g., node weightings) to minimize a loss function (i.e., a measure of the number and/or degree of errors of the network) that results from applying the network to the training set. Once the neural network has been trained, it is applied to the validation set and the degree to which it successfully identifies faces is recorded. If the network makes few or no errors when applied to the validation set, this is a strong indicator that the network will correctly identify faces in photographs that have not already been classified.

The app packaging module 116 takes a lower-order representation of a neural network and packages it into an app to be provided to client devices 140. For example, the app packaging module 116 might be used to create an app for booking and managing trips with a ride-sharing service. In one embodiment, the app might include one or more machine learning based models configured to take various data available at the client device 140 and, e.g., predict whether the device is currently inside a vehicle providing a ride. The full machine learning based models may be too large to provide to client devices 140 over the network 170, so the app instead includes a lower-order representation that is sufficiently accurate to provide a good user experience. Once packaged, the app is made available to client devices 140 (e.g., via the app hosting server 120). The model store 117 includes one or more computer-readable storage-media (e.g., a hard drive) that are configured to store machine learning based models. The training data store 118 includes one or more computer-readable storage media configured to store training data for use in training the machine learning based models.

The app hosting server 120 is one or more computers configured to store apps and make them available to client devices 140. In the embodiment shown in FIG. 1, the app hosting server 120 includes an app provider interface module 122, a user interface module 124, and app storage 126. In other embodiments, the app hosting server 120 contains different and/or additional elements. In addition, the functions may be distributed among the elements in a different manner than described.

The app provider interface module 122 provides an interface with which app providers (e.g., the operator of app provider system 110) can add apps to a marketplace or other on-line store to make them available to users (either free or for payment of value). In one embodiment, an app provider fills out an on-line form with basic information about the app (e.g., name, app provider name, version number, a short description of what it does, and the like) and uploads the app in an appropriate format. The app provider interface module 122 adds the app (along with metadata with some or all of the information provided about the app) to app storage 126. In some cases, the app provider interface module 122 also performs validation actions, such as checking that the app does not exceed a maximum allowable size, scanning the app for malicious code, verifying the identity of the provider, and the like.

The user interface module 124 provides an interface to client devices 140 with which apps can be obtained. In one embodiment, the user interface module 124 provides a user interface which the users can use to search for apps meeting various criteria from a client device 140. Once users find an app they want (e.g., one provided by the app provider system 110), they can download them to their client device 140 via the network 170.

The app storage 126 include one or more computer-readable storage-media that are configured to store apps and associated metadata. Although it is shown as a single entity in FIG. 1, the app storage 126 may be made up from several storage devices distributed across multiple locations. For example, in one embodiment, app storage 126 is provided by a distributed database and file storage system, with download sites located such that most users will be located near (in network terms) at least one copy of popular apps.

The client devices 140 are computing devices suitable for running apps obtained from the app hosting server 120 (or directly from the app provider system 110). The client devices 140 can be desktop computers, laptop computers, smartphones, PDAs, tablets, or any other such device. In the embodiment shown in FIG. 1, the client device 140 includes an application 142 and local storage 144. The application 142 is one that uses a neural network to perform a task, such as one created by the application provider system 110. The local data store 144 is one or more computer readable storage-media and may be relatively small (in terms of the amount of data that can be stored). Thus, the use of a compressed neural network may be desirable, or even required.

The network 170 provides the communication channels via which the other elements of the networked computing environment 100 communicate. The network 170 can include any combination of local area and/or wide area networks, using both wired and/or wireless communication systems. In one embodiment, the network 170 uses standard communications technologies and/or protocols. For example, the network 170 can include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, all or some of the communication links of the network 170 may be encrypted using any suitable technique or techniques.

System Architecture

Figure 2:
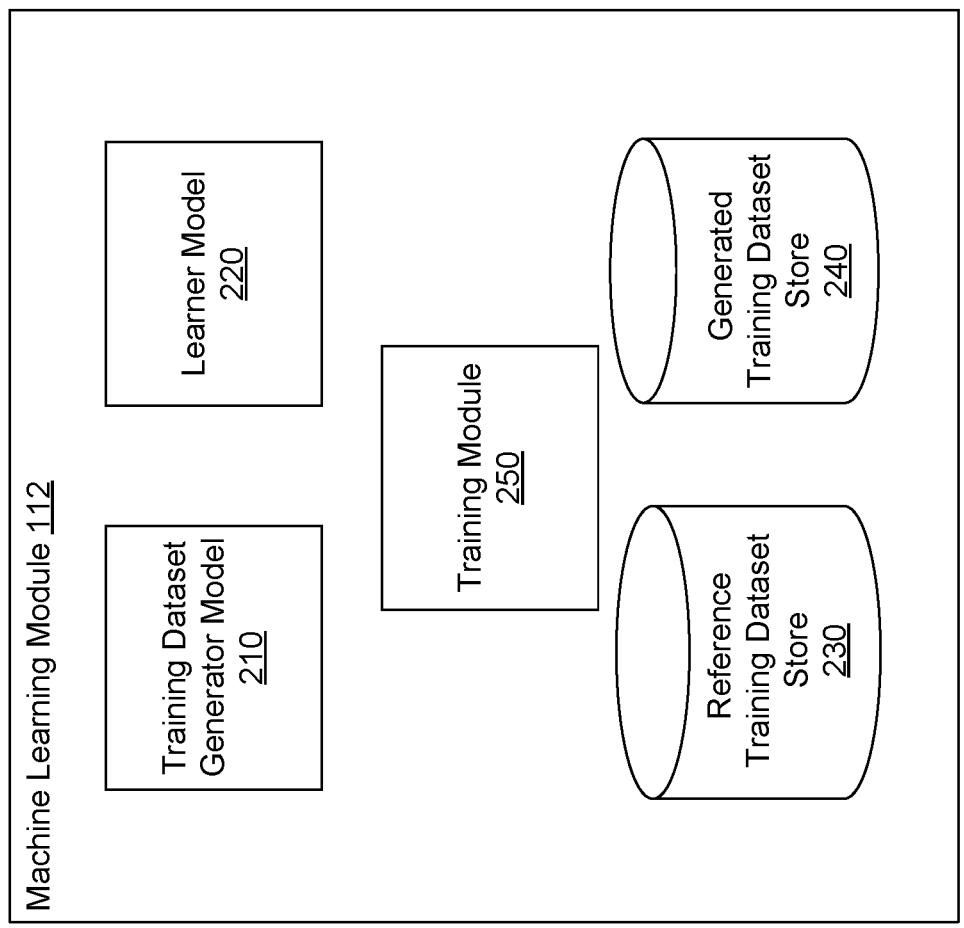
FIG. 2 illustrates a system architecture of a neural network training module, according to one embodiment.

FIG. 2 illustrates a system architecture of the machine learning module 112, according to one embodiment. The machine learning module 112 comprises a training dataset generator model 210, a learner model 220, a training module 250, a reference training dataset store 230, and a generated training dataset store 240. Other embodiments may include more of fewer modules than those indicated herein. Functions performed by a particular module may be performed by other modules than those indicated herein.

A learner model 220 is a machine learning based model, for example, a neural network model. The machine learning module 112 uses training datasets for training one or more learner models 220. The learner model 220 may be a reinforcement learning based model, a supervised learning based model, or an unsupervised learning based model. The learner model 220 may have an architecture. The architecture describes how the learner model 220 is implemented. In an example with a neural network, the architecture may describe a number of layers in the learner model 220 and a size of each layer in the learner model 220. In an example with a tree-like architecture, the architecture maps out each node in tree structure and connections and weights between the various nodes.

In some embodiments, the learner model 220 may be configured to receive images/videos as input and recognize objects in the input images/videos. In an embodiment, the learner model 220 is configured to receive sensor data captured by one or more sensors on a robot as input and generate an output useful for guiding the robot, for example, through an obstacle course. In some embodiments, the learner model 220 is used for receiving sensor data captured by one or more sensors on an autonomous vehicle as input and generating output useful for navigating the autonomous vehicle along a route, for example, through a city. In some embodiments, the learner model 220 is used for processing sequence data, for example, stream data received from sensors, wherein the output, for example, corresponds to a classification of the sequence data. In an embodiment, the learner model 220 is used for processing sentences, for example, for machine translation of sentences from a particular language to another language. Accordingly, the learner model 220 is a neural network configured to receive one or more sentences specified in a particular language and generate output used for translating the received one or more sentences to one or more sentences of another language. The learner model 220 may be implemented in a variety of other contexts not limited to those described above.

The training dataset generator model 210 generates training datasets for training the learner model. The training dataset generator model 210 generates a training dataset using Gaussian noise as input. In other embodiments, other inputs may be used in addition or in substitution of the Gaussian noise, e.g., other types of noise distribution or point data, i.e., unlabeled samples (e.g., unlabeled images can be generated for a learner model trained with images as input). Additionally, the training dataset generator model 210 can generate a label for each generated training sample. The training dataset generator model 210 may generate datasets in batches for use in training of the learning model 220. The dataset generated by the training dataset generator model 210 depends on the type of data processed by the learner model 220. For example, the learner model 220 may be configured to receive images as input and output result used for recognizing objects displayed in the input images and the training dataset generator model 210 generates images processed by the learner model 220. As another example, the learner model 220 may be a reinforcement learning based model configured to output results used by an agent that helps navigate a robot and the training dataset generator model 210 generates images processed by the learner model 220 generates encoded representations of obstacle courses through which the robot navigates. As another example, the learner model 220 may be a reinforcement learning based mode configured to output results used by an agent that helps navigate an autonomous vehicle and the training dataset generator model 210 generates images processed by the learner model 220 generates encoded representations of sensor data (representing data captured by sensors of an autonomous vehicle) or representations of objects in traffic through which the autonomous vehicle navigates. In an embodiment, the training dataset generator model 210 is a machine learning based model, for example, a neural network configured to generate training datasets. For example, the training dataset generator model 210 may be a deconvolution network configured to generate images.

The reference training dataset store 230 stores one or more training datasets that represents reference training dataset as compared to generated training data. The reference training datasets may be provided by users. The reference training dataset may be annotated by users. For example, for learner models 220 that are supervised learning models, the reference training datasets may be labeled by users. For learner models 220 that represents reinforcement learning models used for navigating a robot through an obstacle course, the reference training datasets may be obtained from actual obstacle courses or simulations of obstacle courses verified manually or generated by users.

The generated training dataset store 240 stores training datasets that are generated by the training dataset generator model 210. The training dataset generator model 210 may generate some training datasets and iteratively improve on the generated training datasets. The generated training dataset store 240 may delete previously generated training datasets as newer training datasets that perform better training of learner models are generated.

The training module 250 trains the learner model 220 as well as the training dataset generator model 210. The training module 250 may use gradient descent (or another optimization methodology to minimize the loss function) for adjusting the parameters of the model that is being trained. The training module 250 uses various techniques disclosed herein for training the learner model 220 and the training dataset generator model 210. In one or more embodiments, the training module 250 searches for an optimal architecture for the learner model 220. The training module 250 may train variations of the learner model 220 with varying architectures according to the principled described herein. The trained learner models 220 of varying architectures can be evaluated for accuracy, with the optimal architecture for the learner model 220 having the highest efficiency.

Figure 3:
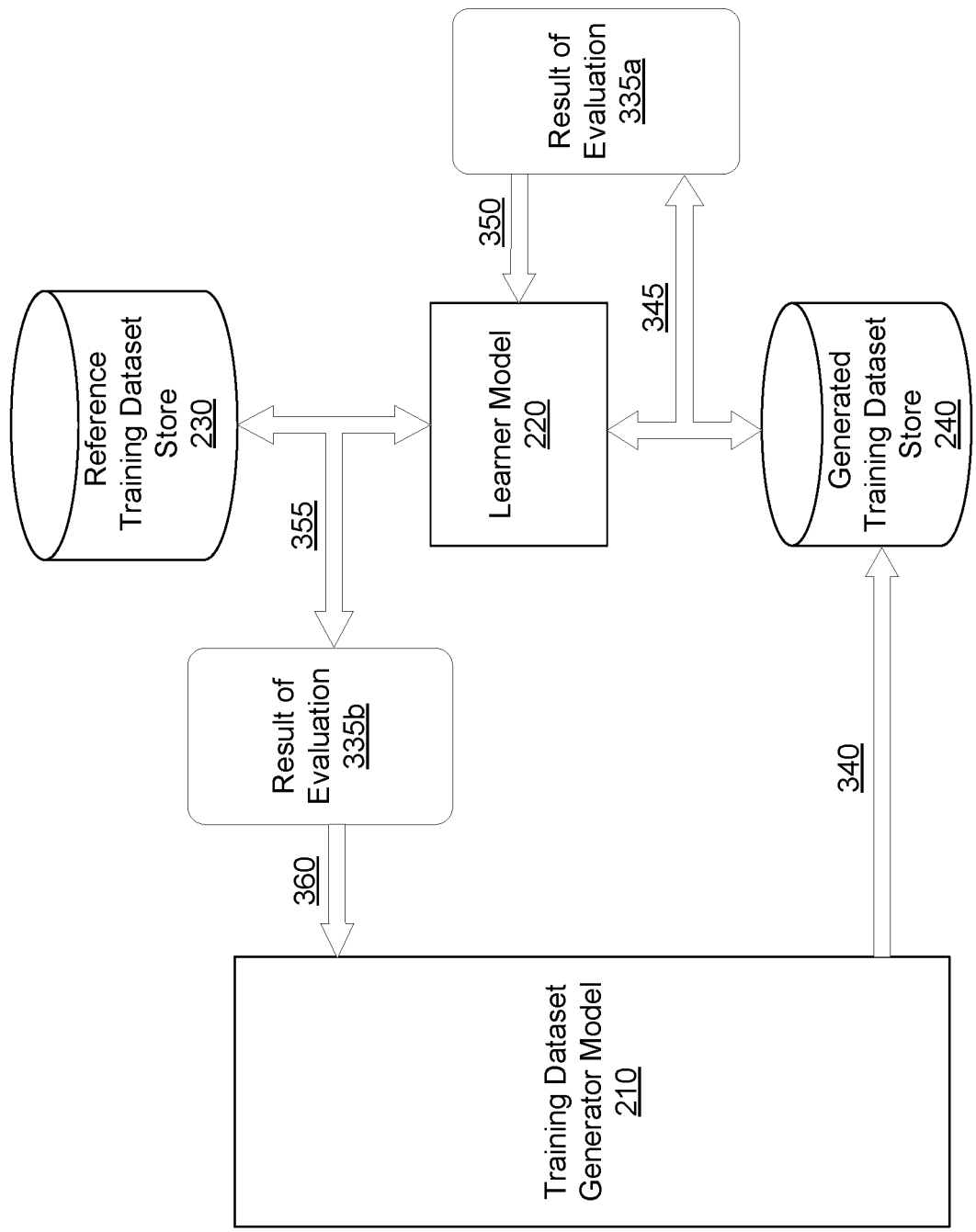
FIG. 3 illustrates the interaction between various modules that form components of the machine learning module as shown in FIG. 2, according to an embodiment.

FIG. 3 illustrates the interaction between various modules that form components of the machine learning module as shown in FIG. 2, according to an embodiment. The training dataset generator model 210 generates 340 training datasets and stores them in the generated training dataset store 240. The learner model 220 uses the generated training datasets from the generated training dataset store 240 and processes them to output results. The machine learning module 112 evaluates 345 the output of the learner model 220 to determine results of evaluation 335a, for example, based on a loss function. The results of evaluation 335a is used to adjust the parameters of the learner model 220, for example, based on gradient descent. In an embodiment, the learner model 220 adjusts parameters using stochastic gradient descent.

The machine learning module 112 further evaluates 355 the learner model 220 using the reference training datasets stored in the reference training dataset store 230 to determine results of evaluation 335b. The machine learning module 112 uses 360 the results of evaluation 335b to adjust the parameters of the training dataset generator model 210, for example, using gradient descent.

These steps are repeated until the parameters of the training dataset generator model 210 are improved and generate training datasets that are within a threshold of the reference training datasets in terms of effectiveness in training the learner model.

Overall Process

Figure 4:
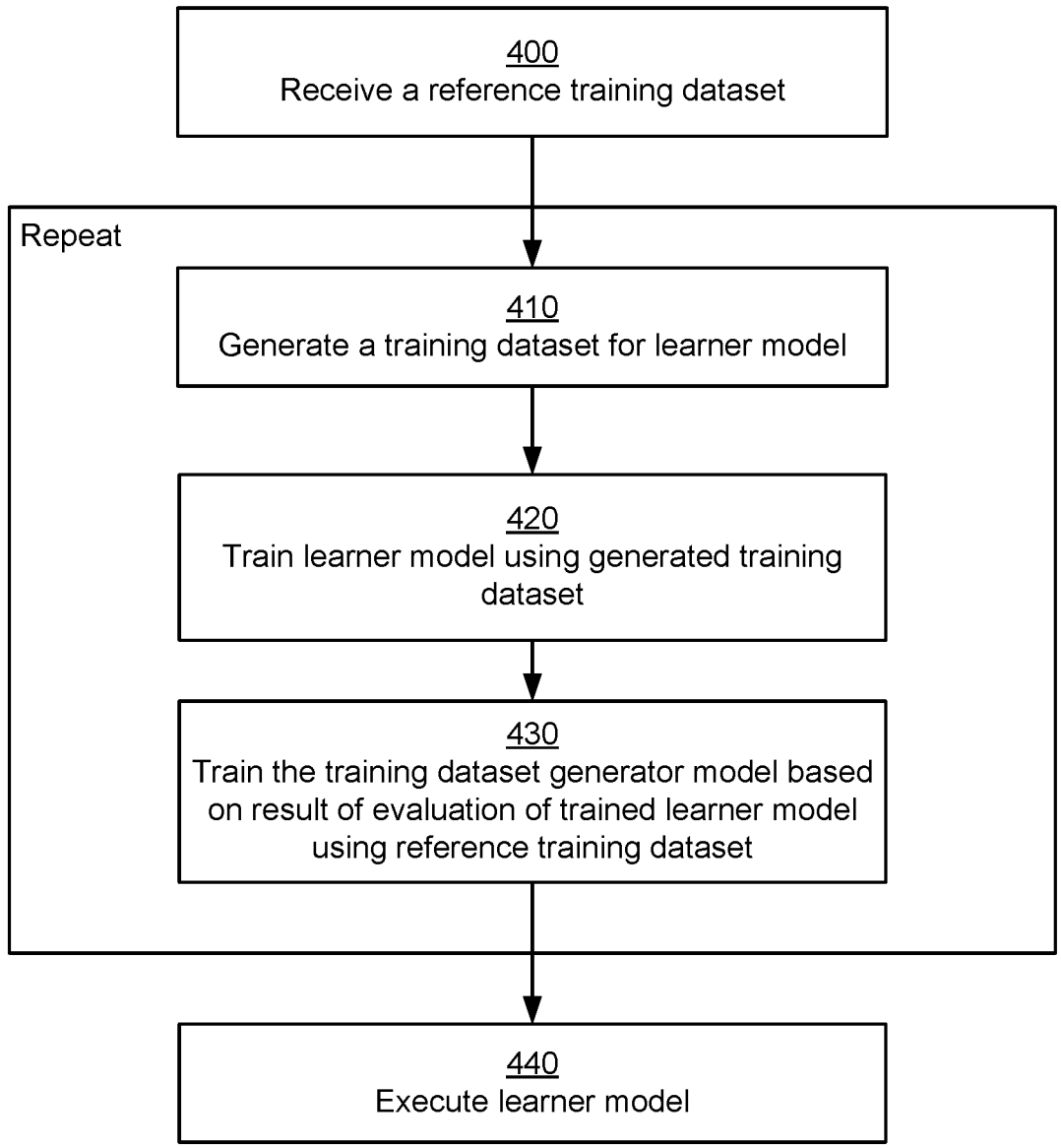
FIG. 4 is a flowchart illustrating the process of generating training datasets, according to one embodiment.
Figure 5:
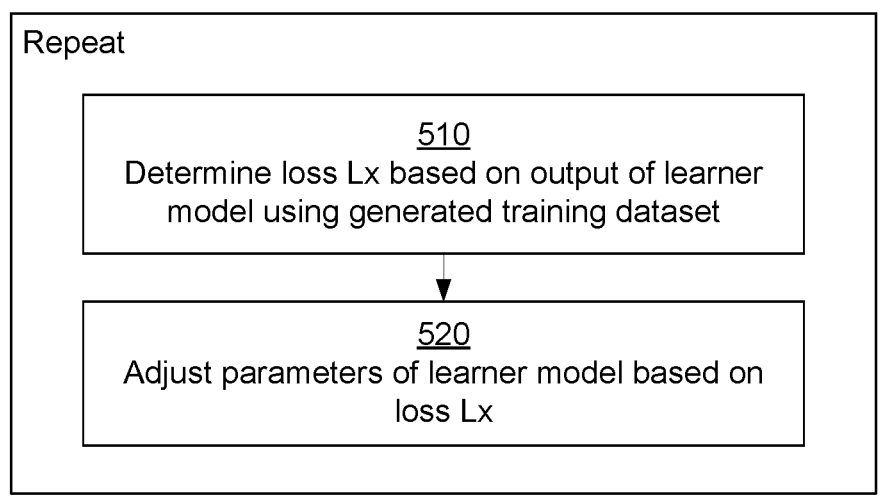
FIG. 5 shows the details of the step of training the learner model using the generated training dataset, according to an embodiment.
Figure 6:
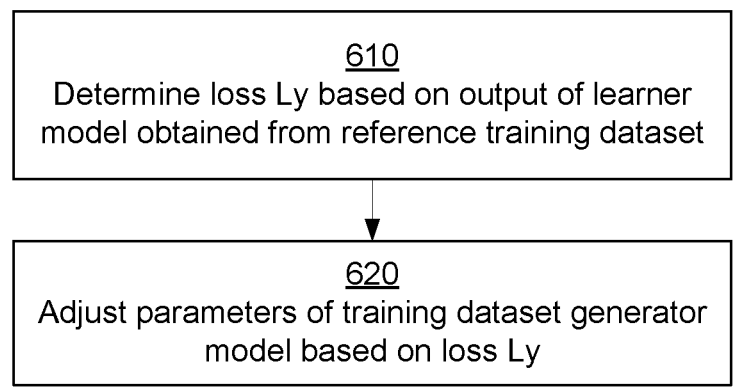
FIG. 6 shows the details of the step of training the training dataset generator model, according to an embodiment.

FIGS. 4-6 show various flowcharts illustrating the processes related to generating training datasets, according to various embodiments. The steps described herein may be processed in an order different from that shown in the flowchart. Furthermore, the steps may be performed by modules other than those indicated herein.

FIG. 4 is a flowchart illustrating the process of generating training datasets, according to one embodiment. The machine learning module 112 receives 400 a reference training dataset. The machine learning module 112 may receive 400 the reference training dataset from one or more users, for example, users that may label training data. The machine learning module 112 repeats the following steps 410, 420, and 430. Accordingly, the machine learning module 112 generates 410 a training dataset for training the learner model. The machine learning module 112 generates the training dataset by inputting Gaussian noise to generate a training dataset including generated training samples. The machine learning module 112 trains 420 the learner model using the generated training dataset. The machine learning module 112 evaluates the trained learner models with the reference training dataset. The machine learning module 112 trains 430 the training dataset generator model based on the results of evaluation of the trained learner models using the reference training dataset. Accordingly, the 410, 420, and 430 adjusts the parameters of the training dataset generator model. The machine learning module 112 repeats the steps 410, 420, and 430 until the training datasets generated by the training dataset generator model are able to train the learner model to a similar degree of accuracy as a learner model trained with the reference training dataset. The machine learning module 112 executes the learner model for new inputs.

FIG. 5 shows the details of the step of training the learner model using the generated training dataset, according to an embodiment. The machine learning module 112 repeats the steps 510 and 520 a plurality of times, for example, until a metric indicating the performance of the learner model indicates more than a threshold performance or until the improvement in performance of the learner model with successive iterations is below a threshold value. The machine learning module 112 determines 510 a loss Lx based on a function of the output of the learner model when provided with input corresponding to the generated training dataset. The machine learning module 112 adjusts 520 the parameters of the learner model based on the loss Lx, for example, using gradient descent techniques or other optimization techniques. In an embodiment, the machine learning module 112 adjusts parameters of the learner model using stochastic gradient techniques.

FIG. 6 shows the details of the step of training the training dataset generator model, according to an embodiment. The machine learning module 112 repeats the steps 610 and 620 a plurality of times, for example, until a metric indicating the performance of the training dataset generator model indicates more than a threshold performance or until the improvement in performance of the training dataset generator model with successive iterations is below a threshold value. The machine learning module 112 determines 510 a loss Ly based on a function of the output of the learner model when provided with input corresponding to the reference training dataset. The machine learning module 112 adjusts 520 the parameters of the training dataset generator model based on the loss Ly, for example, using gradient descent techniques or other optimization techniques. In an embodiment, the machine learning module 112 adjusts parameters of the learner model using stochastic gradient techniques.

In some embodiments, the loss Lx is an L2 loss functions, for example, a square of the difference between the output of the learner model and the corresponding output values generated by the training dataset generator model. Other embodiments can use other loss functions as Lx, for example, any parameterized function. Loss functions generally calculate a difference between an output of the learner model and an expected output, e.g., either from the training dataset generator model or provided in the reference training dataset.

In some embodiments, the learner model is a supervised learning model, for example, a model used for performing segmentation, regression, or translation. In these embodiments, the Ly loss function may be based on a soft-max function. The supervised learning based learner model may perform regression, segmentation, translation, and so on. The Ly loss function may be an L2 loss function.

In some embodiments, the learner model is an unsupervised learning model, for example, an autoencoder or a model for performing clustering. In these embodiments, the Ly loss function may be based on a reconstruction loss function.

In some embodiments, the learner model is a reinforcement learning based model, for example, a model based on evolution strategies. In a reinforcement learning based model, states of an environment, actions that can be taken in various states, and rewards (or penalties) caused by actions. A Q-function (also referred to as a reward function) inputs an action and a state pair to determine a Q-value, i.e., an expected discounted cumulative reward. In these embodiments, the Ly loss function may be based on policy gradient or Q-values.

The techniques for generating training datasets have several beneficial advantages in systems. Embodiments of the invention can be used to achieve data compression, for example, by extracting a small training dataset from a larger training dataset and using the small training dataset for storing or transmitting. The small training dataset is used as a reference training dataset and is used in combination with generated training datasets to train the neural network to achieve high performance in less time. Embodiments of the invention can be used for data augmentation, i.e., generate a training data-set that is much larger than a received training dataset and using the generated training dataset to train the neural network for better overall performance of the trained models as compared to training the neural network with the original data-set that was received. Embodiments of the invention can be used for curriculum learning, i.e., to generate data and find its exact ordering to be used to train the neural network for better performance.

In some embodiment, training data generated from by the training dataset generator model is compared with the generated data from GANs (generative adversarial model), for example, in the image classification domain. The data from GANs may be more realistic than the data generated by the training dataset generator model, the data generated by the training dataset generator model is several orders of magnitude more efficient in training a learner than GANs generated data.

Also, experimental results demonstrate that a combination of training dataset generator model and GANs, can overcome the mode collapse problem of vanilla GANs. The generated data from the training dataset generator model and GAN is compared. For example, in case of MNIST, while the generators from GANs can replicate original images, training a learner model using these images takes millions of gradient steps. On the other hand, while the images generated from training dataset generator models can be very noisy (and may not be recognizable by humans), they still can be used to achieve similar learner performance as the GAN generated images, but require much fewer gradient steps.

Computing System Architecture

Figure 7:
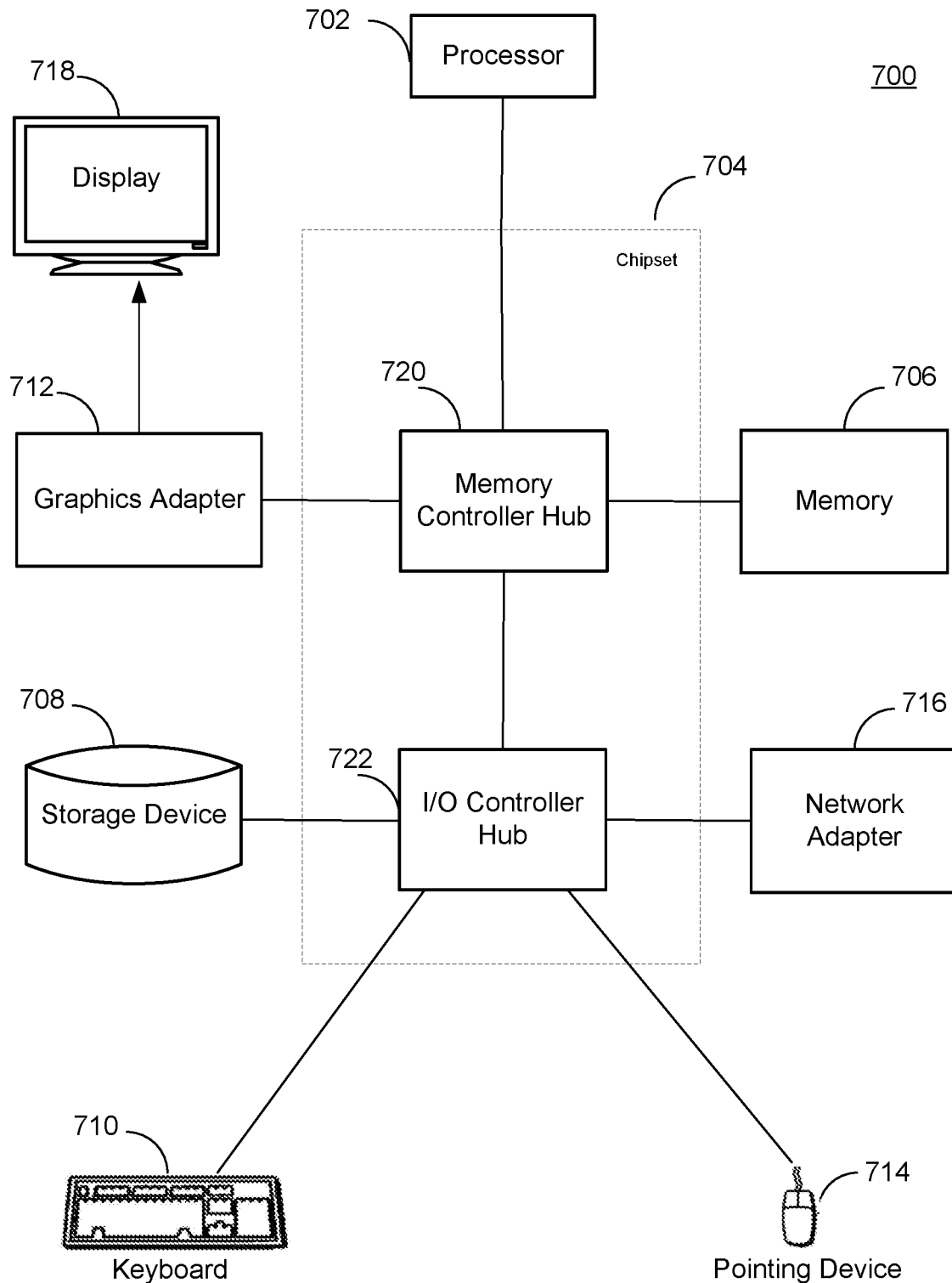
FIG. 7 is a high-level block diagram illustrating an example of a computer system architecture suitable for use in the system environment of FIG. 1, according to one embodiment.

FIG. 7 is a high-level block diagram illustrating an example of a computer suitable for use in the system environment of FIG. 1, according to one embodiment. The example computer 700 illustrated in FIG. 7 may be used as a client device 140, application hosting server 120, or application provider system 110. The example computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer 700 have different architectures.

In the embodiment shown in FIG. 7, the storage device 708 is a non-transitory computer-readable storage medium such as a hard drive, compact disk read-only memory (CD-ROM), DVD, or a solid-state memory device. The memory 706 holds instructions and data used by the processor 702. The pointing device 714 is a mouse, track ball, touch-screen, or other type of pointing device, and is used in combination with the keyboard 710 (which may be an on-screen keyboard) to input data into the computer system 700. The graphics adapter 712 displays images and other information on the display 718. The network adapter 716 couples the computer system 700 to one or more computer networks (e.g., network 170).

The types of computers used by the entities of FIG. 1 can vary depending upon the embodiment and the processing power required by the entity. For example, the application hosting server 120 might include a distributed database system comprising multiple blade servers working together to provide the functionality described. Furthermore, the computers can lack some of the components described above, such as keyboards 710, graphics adapters 712, and displays 718.

Additional Considerations

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for compressing neural networks. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

What is claimed is:

1. A computer implemented method comprising:
receiving a reference training dataset including one or more reference training samples;
accessing a training dataset generator model configured to generate training datasets;
accessing a learner model configured to process the generated training datasets and the reference training dataset;
in one or more iterations:
generating, by the training dataset generator model, a training dataset according to noise as input, the training dataset including one or more training samples generated by the training dataset generator model;
training the learner model using the generated training dataset by determining a first loss based on a difference between an output value predicted by the learner model and a corresponding output value generated by the training dataset generator model, wherein parameters of the learner model are adjusted based on the first loss;

determining a second loss based on execution of the trained learner model using the reference training dataset; and adjusting parameters of the training dataset generator model based on the second loss determined based on execution of the trained learner model using the reference training dataset;

storing one or more training datasets generated by the training dataset generator model; and storing the training dataset generator model with adjusted parameters and the trained learner model.

2. The computer implemented method of claim 1, wherein adjusting parameters of the training dataset generator model comprises:

determining a gradient of loss of the learner model on the reference training dataset with respect to parameters of the training dataset generator model; and modifying the parameters of the training dataset generator model based on the determined gradient.

3. The computer implemented method of claim 1, wherein the learner model is a supervised learning based model and evaluating the trained learner model using the reference training dataset comprises evaluating a softmax function using an output value predicted by the learner model.

4. The computer implemented method of claim 1, wherein the learner model is an unsupervised learning based model and evaluating the trained learner model using the reference training dataset comprises determining a reconstruction loss value based on a reconstructed output predicted by the learner model and the input of the learner model.

5. The computer implemented method of claim 1, wherein the learner model is a reinforcement learning based model and evaluating the trained learner model using the reference training dataset comprises determining a policy gradient.

6. The computer implemented method of claim 1, wherein the training dataset generator model is a deconvolution network configured to generate an image as a training sample.

7. The computer implemented method of claim 1, wherein an agent navigates a moveable apparatus according to output generated by the learner model.

8. The computer implemented method of claim 7, wherein the moveable apparatus is an autonomous vehicle driving in a real-world environment and the learner model receives sensor data of the autonomous vehicle.

9. The computer implemented method of claim 7, wherein the moveable apparatus is a robot navigating through an obstacle course and the learner model receives sensor data of the robot.

10. The computer implemented method of claim 1, wherein the learner model is configured to receive an image as input and to output an object identified in the image.

11. The computer implemented method of claim 1, wherein the learner model is configured to receive one or more sentences specified in a first language and to output a translation of the one or more sentences in a second language.

12. A computer system comprising:
one or more processors; and
a non-transitory computer readable storage medium comprising instructions that, when executed by the one or more processors, cause the one or more processors to perform operations comprising:
receiving a reference training dataset including one or more reference training samples;
accessing a training dataset generator model configured to generate training datasets;
accessing a learner model configured to process the generated training datasets and the reference training dataset;
in one or more iterations:
generating, by the training dataset generator model, a training dataset according to noise as input, the training dataset including one or more training samples generated by the training dataset generator model;
training the learner model using the generated training dataset by determining a first loss based on a difference between an output value predicted by the learner model and a corresponding output value generated by the training dataset generator model, wherein parameters of the learner model are adjusted based on the first loss;
determining a second loss based on execution of the trained learner model using the reference training dataset; and
adjusting parameters of the training dataset generator model based on the second loss determined based on execution of the trained learner model using the reference training dataset;
storing one or more training datasets generated by the training dataset generator model; and
storing the training dataset generator model with adjusted parameters and the trained learner model.

13. The computer system of claim 12, wherein adjusting parameters of the training dataset generator model comprises:
determining a gradient of loss of the learner model on the reference training dataset with respect to parameters of the training dataset generator model; and
modifying the parameters of the training dataset generator model based on the determined gradient.

14. The computer system of claim 12, wherein the learner model is a supervised learning based model and evaluating the trained learner model using the reference training dataset comprises evaluating a softmax function using an output value predicted by the learner model.

15. A non-transitory computer readable storage medium comprising instructions that, when executed by one or more processors, cause the one or more processors to perform operations comprising:
receiving a reference training dataset including one or more reference training samples;
accessing a training dataset generator model configured to generate training datasets;
accessing a learner model configured to process the generated training datasets and the reference training dataset;
in one or more iterations:
generating, by the training dataset generator model, a training dataset according to noise as input, the training dataset including one or more training samples generated by the training dataset generator model;
training the learner model using the generated training dataset by determining a first loss based on a difference between an output value predicted by the learner model and a corresponding output value generated by the training dataset generator model, wherein parameters of the learner model are adjusted based on the first loss;
determining a second loss based on execution of the trained learner model using the reference training dataset; and adjusting parameters of the training dataset generator model based on the second loss determined based on execution of the trained learner model using the reference training dataset;

storing one or more training datasets generated by the training dataset generator model; and storing the training dataset generator model with adjusted parameters and the trained learner model.

16. The non-transitory computer readable storage medium of claim 15, wherein adjusting parameters of the training dataset generator model comprises:

determining a gradient of loss of the learner model on the reference training dataset with respect to parameters of the training dataset generator model; and modifying the parameters of the training dataset generator model based on the determined gradient.

17. The non-transitory computer readable storage medium of claim 15, wherein the learner model is a supervised learning based model and evaluating the trained learner model using the reference training dataset comprises evaluating a softmax function using an output value predicted by the learner model.

* * * * *